(12) United States Patent
Nilekar

(10) Patent No.: US 12,132,708 B2
(45) Date of Patent: Oct. 29, 2024

(54) METHOD AND SYSTEM FOR PROVIDING AN ENTERPRISE SOFTWARE DISTRIBUTION PLATFORM

(71) Applicant: JPMorgan Chase Bank, N.A., New York, NY (US)

(72) Inventor: Rohit Nilekar, Hyderabad (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 351 days.

(21) Appl. No.: 17/456,198

(22) Filed: Nov. 23, 2021

(65) Prior Publication Data

US 2022/0200962 A1 Jun. 23, 2022

Related U.S. Application Data

(60) Provisional application No. 63/144,249, filed on Feb. 1, 2021.

(30) Foreign Application Priority Data

Dec. 19, 2020 (IN) .............................. 202011055354

(51) Int. Cl.
*G06F 8/60* (2018.01)
*H04L 9/40* (2022.01)

(52) U.S. Cl.
CPC ............ *H04L 63/0263* (2013.01); *G06F 8/60* (2013.01); *H04L 63/08* (2013.01); *H04L 63/20* (2013.01)

(58) Field of Classification Search
CPC ..... H04L 63/0263; H04L 63/08; H04L 63/20; G06F 8/60
See application file for complete search history.

(56) References Cited

U.S. PATENT DOCUMENTS

| | | | |
|---|---|---|---|
| 9,189,757 B2 * | 11/2015 | Finlayson | G06Q 10/06 |
| 2012/0005476 A1 * | 1/2012 | Wei | H04L 63/0272 |
| | | | 713/153 |
| 2017/0180396 A1 * | 6/2017 | Finnig | H04L 63/1408 |
| 2020/0210165 A1 * | 7/2020 | Pisal | H04L 47/245 |

* cited by examiner

*Primary Examiner* — Kostas J Katsikis
(74) *Attorney, Agent, or Firm* — GREENBLUM & BERNSTEIN, P.L.C.

(57) ABSTRACT

A method for providing an enterprise distribution platform to facilitate software distribution over a public computer network is disclosed. The method includes receiving, via a network interface, a request from the public computer network, the request relating to a solicitation for a software package; determining, by using a network security system, whether the request is forwarded from the public computer network to a private computer network based on a predetermined security rule; authenticating, via a web proxy, the request based on a result of the determining; identifying, based on a result of the authentication, the software package corresponding to the request; retrieving, from a memory, the identified software package; and transmitting, via the network interface, the retrieved software package in response to the request.

20 Claims, 5 Drawing Sheets

METHOD AND SYSTEM FOR PROVIDING AN ENTERPRISE SOFTWARE DISTRIBUTION PLATFORM

CROSS-REFERENCE TO RELATED APPLICATIONS

This application claims the benefit of Indian Provisional Patent Application No. 202011055354, filed Dec. 19, 2020, which is hereby incorporated by reference in its entirety. This application also claims the benefit of U.S. Provisional Patent Application Ser. No. 63/144,249, filed Feb. 1, 2021, which is hereby incorporated by reference in its entirety.

BACKGROUND

1. Field of the Disclosure

This technology generally relates to methods and systems for software distribution, and more particularly to methods and systems for providing an enterprise distribution platform to facilitate software and data distribution over a public computer network.

2. Background Information

Many modern business entities operate private enterprise networks to connect employee devices and facilitate day-to-day business operations. These private enterprise networks are often intentionally insulated from public computer networks such as, for example, an internet network via multiple layers of network security. Historically, implementations of insulated, private enterprise networks have resulted in varying degrees of success with respect to distributing necessary software and data from within the private enterprise networks to external computing devices connected via public computer networks.

One drawback of conventional software and data distribution techniques is that in many instances, the private enterprise network must connect directly to an external computing device via the public computer network. As a result, the direct connection between the private enterprise network and the public computer network exposes the private enterprise network to potential security risks. Additionally, due to the multiple layers of network security, the private enterprise network creates challenges for external computing devices that send data to the private enterprise network via the public computer network.

Therefore, there is a need for an enterprise distribution platform that is integrated with the private enterprise network to facilitate software and data distribution to external computing devices via a public computer network.

SUMMARY

The present disclosure, through one or more of its various aspects, embodiments, and/or specific features or sub-components, provides, inter alia, various systems, servers, devices, methods, media, programs, and platforms for providing an enterprise distribution platform to facilitate software and data distribution over a public computer network.

According to an aspect of the present disclosure, a method for providing an enterprise distribution platform to facilitate software distribution over a public computer network is disclosed. The method is implemented by at least one processor. The method may include receiving, via a network interface, at least one request from the public computer network, the at least one request may relate to a solicitation for at least one software package; determining, by using a network security system, whether the at least one request is forwarded from the public computer network to a private computer network based on at least one predetermined security rule; authenticating, via a web proxy, the at least one request based on a result of the determining; identifying, based on a result of the authentication, the at least one software package corresponding to the at least one request; retrieving, from a memory, the identified at least one software package; and transmitting, via the network interface, the retrieved at least one software package in response to the at least one request.

In accordance with an exemplary embodiment, the public computer network may include a global system of interconnected computer networks that uses an internet protocol suite to communicate between at least one network and at least one device.

In accordance with an exemplary embodiment, the at least one request may include at least one from among a user identifier, a user credential, a device identifier, and a software package identifier.

In accordance with an exemplary embodiment, the enterprise distribution platform may be integrated into at least one private cloud network.

In accordance with an exemplary embodiment, the at least one request may include an upload of new data from a user device to the at least one private cloud network via the enterprise distribution platform, the upload may correspond to a transfer of the new data.

In accordance with an exemplary embodiment, the at least one software package may be transmitted along the same authenticated path as the at least one request without additional authentication.

In accordance with an exemplary embodiment, at least one subsequent software package may be transmitted along the same authenticated path as the at least one request without additional authentication, the at least one subsequent software package may include pre-authenticated identifying information.

In accordance with an exemplary embodiment, the network security system may include at least one from among a physical security as a service system, an intrusion detection system, and an intrusion prevention system.

According to an aspect of the present disclosure, a computing device configured to implement an execution of a method for providing an enterprise distribution platform to facilitate software distribution over a public computer network is disclosed. The computing device including a processor; a memory; and a communication interface coupled to each of the processor and the memory, wherein the processor may be configured to receive, via a network interface, at least one request from the public computer network, the at least one request may relate to a solicitation for at least one software package; determine, by using a network security system, whether the at least one request is forwarded from the public computer network to a private computer network based on at least one predetermined security rule; authenticate, via a web proxy, the at least one request based on a result of the determining; identify, based on a result of the authentication, the at least one software package corresponding to the at least one request; retrieve, from a memory, the identified at least one software package; and transmit, via the network interface, the retrieved at least one software package in response to the at least one request.

In accordance with an exemplary embodiment, the public computer network may include a global system of interconnected computer networks that uses an internet protocol suite to communicate between at least one network and at least one device.

In accordance with an exemplary embodiment, the at least one request may include at least one from among a user identifier, a user credential, a device identifier, and a software package identifier.

In accordance with an exemplary embodiment, the processor may be further configured to integrate the enterprise distribution platform into at least one private cloud network.

In accordance with an exemplary embodiment, the at least one request may include an upload of new data from a user device to the at least one private cloud network via the enterprise distribution platform, the upload may correspond to a transfer of the new data.

In accordance with an exemplary embodiment, the processor may be further configured to transmit the at least one software package along the same authenticated path as the at least one request without additional authentication.

In accordance with an exemplary embodiment, the processor may be further configured to transmit at least one subsequent software package along the same authenticated path as the at least one request without additional authentication, the at least one subsequent software package may include pre-authenticated identifying information.

In accordance with an exemplary embodiment, the network security system may include at least one from among a physical security as a service system, an intrusion detection system, and an intrusion prevention system.

According to an aspect of the present disclosure, a non-transitory computer readable storage medium storing instructions for providing an enterprise distribution platform to facilitate software distribution over a public computer network is disclosed. The storage medium including executable code which, when executed by a processor, may cause the processor to receive, via a network interface, at least one request from the public computer network, the at least one request may relate to a solicitation for at least one software package; determine, by using a network security system, whether the at least one request is forwarded from the public computer network to a private computer network based on at least one predetermined security rule; authenticate, via a web proxy, the at least one request based on a result of the determining; identify, based on a result of the authentication, the at least one software package corresponding to the at least one request; retrieve, from a memory, the identified at least one software package; and transmit, via the network interface, the retrieved at least one software package in response to the at least one request.

In accordance with an exemplary embodiment, the at least one request may include at least one from among a user identifier, a user credential, a device identifier, and a software package identifier.

In accordance with an exemplary embodiment, the executable code may further cause the processor to integrate the enterprise distribution platform into at least one private cloud network, the at least one request may include an upload of new data from a user device to the at least one private cloud network via the enterprise distribution platform and the upload may correspond to a transfer of the new data.

In accordance with an exemplary embodiment, the executable code may further cause the processor to transmit the at least one software package along the same authenticated path as the at least one request without additional authentication.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
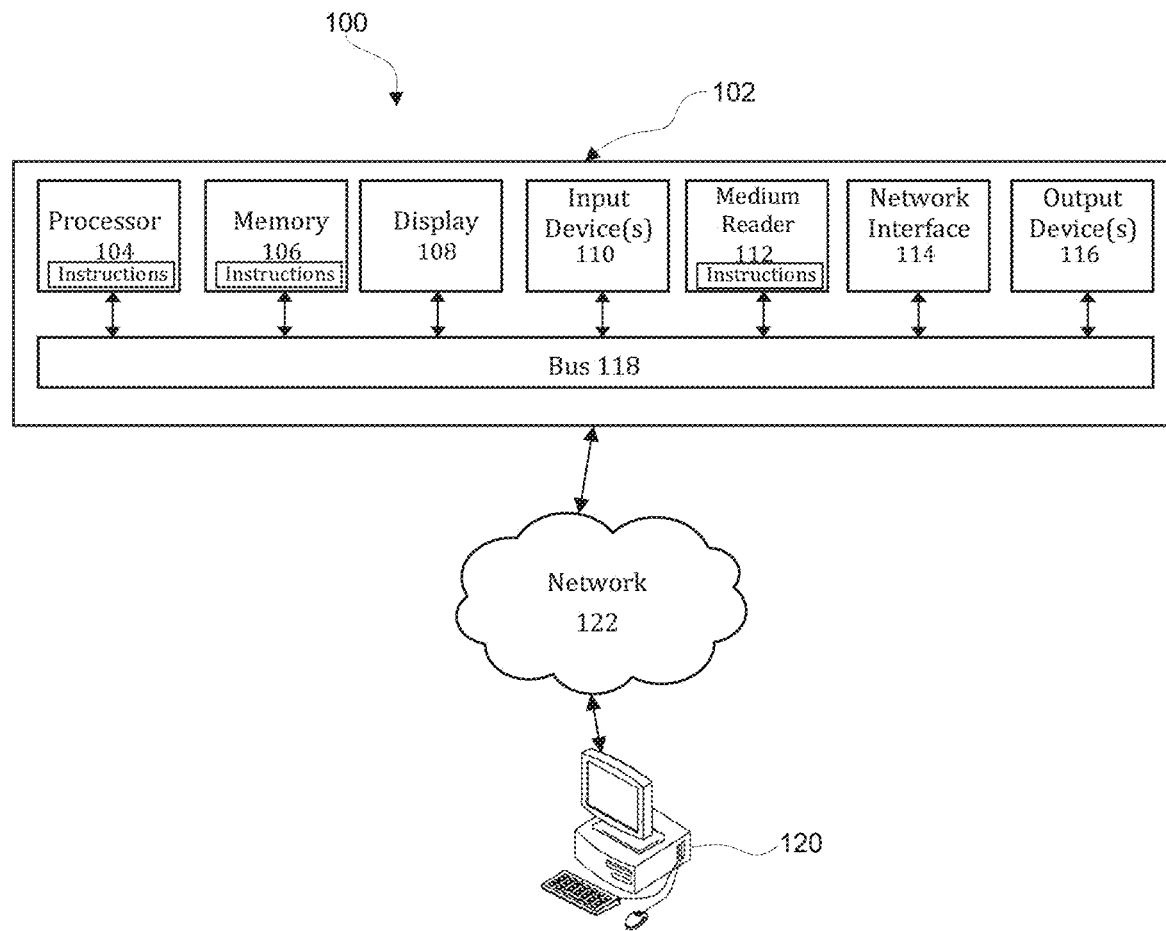
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing an enterprise distribution platform to facilitate software and data distribution over a public computer network.

Figure 2:
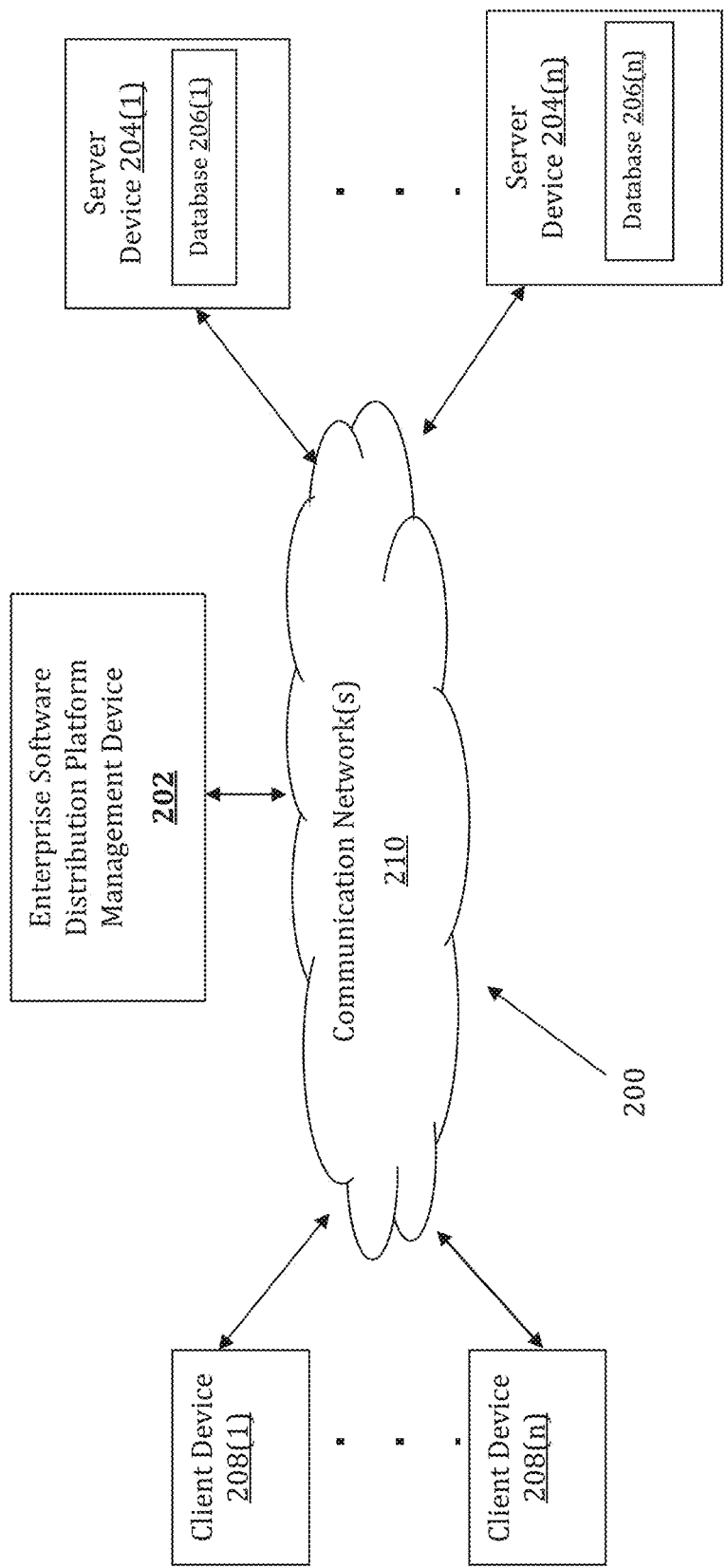
FIG. 2 illustrates an exemplary diagram of a network environment.

Referring to FIG. 2, a schematic of an exemplary network environment 200 for implementing a method for providing an enterprise distribution platform to facilitate software and data distribution over a public computer network is illustrated. In an exemplary embodiment, the method is executable on any networked computer platform, such as, for example, a personal computer (PC).

The method for providing an enterprise distribution platform to facilitate software and data distribution over a public computer network may be implemented by an Enterprise Software Distribution Platform Management (ESDPM) device 202. The ESDPM device 202 may be the same or similar to the computer system 102 as described with respect to FIG. 1. The ESDPM device 202 may store one or more applications that can include executable instructions that, when executed by the ESDPM device 202, cause the ESDPM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ESDPM device 202 itself, may be located in virtual server(s) running in a cloud-based computing environment rather than being tied to one or more specific physical network computing devices. Also, the application(s) may be running in one or more virtual machines (VMs) executing on the ESDPM device 202. Additionally, in one or more embodiments of this technology, virtual machine(s) running on the ESDPM device 202 may be managed or supervised by a hypervisor.

In the network environment 200 of FIG. 2, the ESDPM device 202 is coupled to a plurality of server devices 204(1)-204(n) that hosts a plurality of databases 206(1)-206(n), and also to a plurality of client devices 208(1)-208(n) via communication network(s) 210. A communication interface of the ESDPM device 202, such as the network interface 114 of the computer system 102 of FIG. 1, operatively couples and communicates between the ESDPM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ESDPM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ESDPM devices that efficiently implement a method for providing an enterprise distribution platform to facilitate software and data distribution over a public computer network.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ESDPM device 202 may be a standalone device or integrated with one or more other devices or apparatuses, such as one or more of the server devices 204(1)-204(n), for example. In one particular example, the ESDPM device 202 may include or be hosted by one of the server devices 204(1)-204(n), and other arrangements are also possible. Moreover, one or more of the devices of the ESDPM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ESDPM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to software packages, downloaded data, uploaded data, user identifiers, user credentials, device identifiers, and software package identifiers.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ESDPM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ESDPM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ESDPM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ESDPM device 202, the server devices 204(1)-204(n), or the client devices 208(1)-208(n), for example, may be configured to operate as virtual instances on the same physical machine. In other words, one or more of the ESDPM device 202, the server devices 204(1)-204(n), or the client devices 208(1)-208(n) may operate on the same physical device rather than as separate devices communicating through communication network(s) 210. Additionally, there may be more or fewer ESDPM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof The ESDPM device 202 is described and shown in FIG. 3 as including an enterprise software distribution platform management module 302, although it may include other rules, policies, modules, databases, or applications, for example. As will be described below, the enterprise software distribution platform management module 302 is configured to implement a method for providing an enterprise distribution platform to facilitate software and data distribution over a public computer network.

Figure 3:
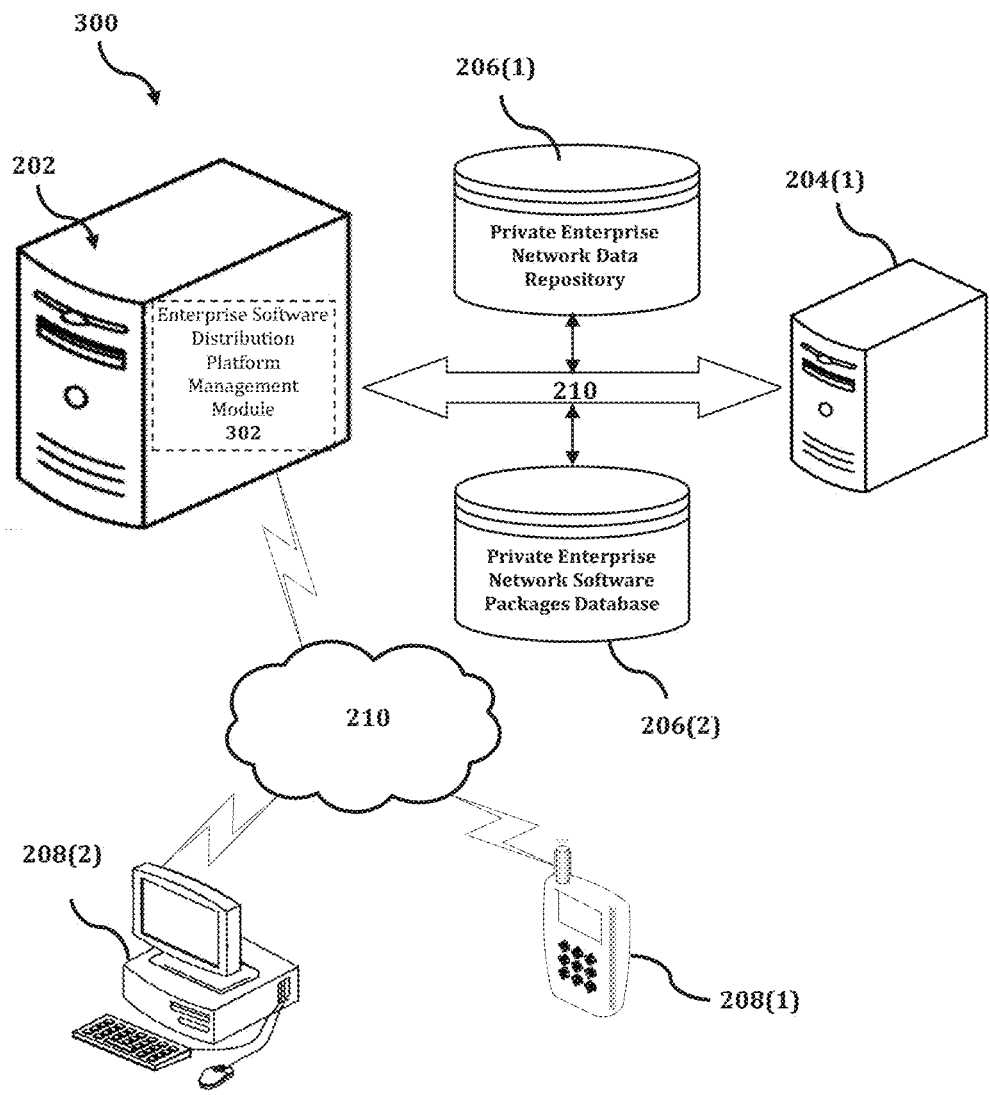
FIG. 3 shows an exemplary system for implementing a method for providing an enterprise distribution platform to facilitate software and data distribution over a public computer network.

An exemplary process 300 for implementing a mechanism for providing an enterprise distribution platform to facilitate software and data distribution over a public computer network by utilizing the network environment of FIG. 2 is shown as being executed in FIG. 3. Specifically, a first client device 208(1) and a second client device 208(2) are illustrated as being in communication with ESDPM device 202. In this regard, the first client device 208(1) and the second client device 208(2) may be "clients" of the ESDPM device 202 and are described herein as such. Nevertheless, it is to be known and understood that the first client device 208(1) and/or the second client device 208(2) need not necessarily be "clients" of the ESDPM device 202, or any entity described in association therewith herein. Any additional or alternative relationship may exist between either or both of the first client device 208(1) and the second client device 208(2) and the ESDPM device 202, or no relationship may exist.

Further, ESDPM device 202 is illustrated as being able to access a private enterprise network data repository 206(1) and a private enterprise network software packages database 206(2). The enterprise software distribution platform management module 302 may be configured to access these databases for implementing a method for providing an enterprise distribution platform to facilitate software and data distribution over a public computer network.

The first client device 208(1) may be, for example, a smart phone. Of course, the first client device 208(1) may be any additional device described herein. The second client device

208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ESDPM device 202 via broadband or cellular communication. Of course, these embodiments are merely exemplary and are not limiting or exhaustive.

Upon being started, the enterprise software distribution platform management module 302 executes a process for providing an enterprise distribution platform to facilitate software and data distribution over a public computer network. An exemplary process for providing an enterprise distribution platform to facilitate software and data distribution over a public computer network is generally indicated at flowchart 400 in FIG. 4.

Figure 4:
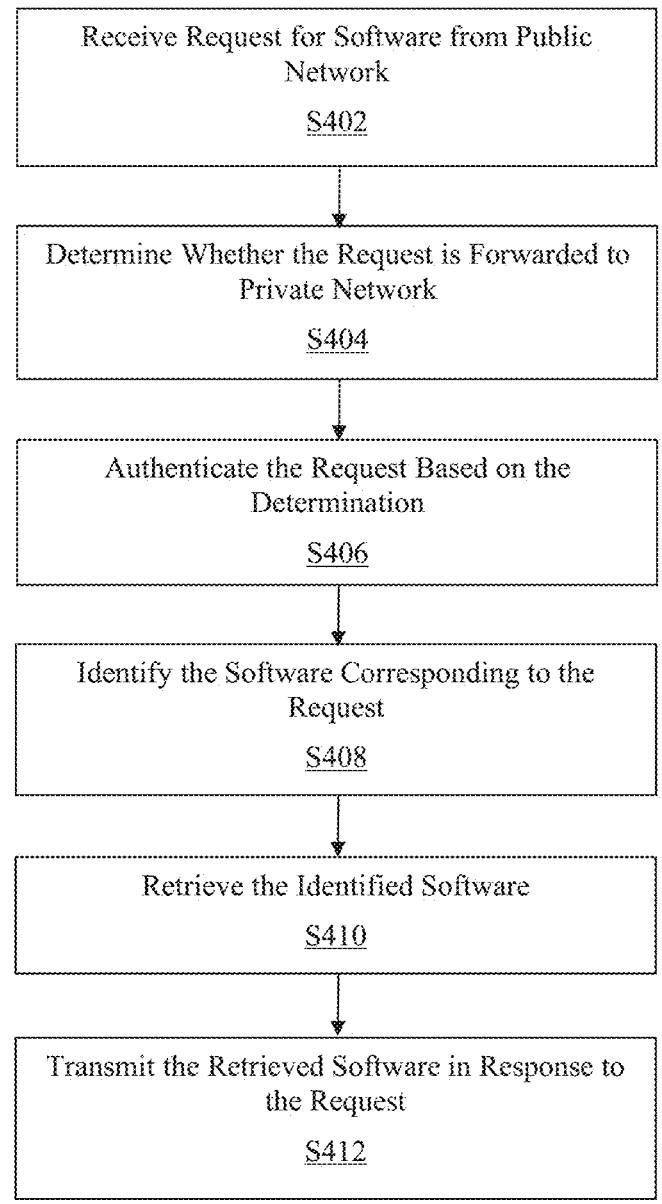
FIG. 4 is a flowchart of an exemplary process for implementing a method for providing an enterprise distribution platform to facilitate software and data distribution over a public computer network.

In the process 400 of FIG. 4, at step S402, a request relating to a solicitation for a software package may be received via a network interface from a public computer network such as, for example, an internet network. The public computer network may include a global system of interconnected computer networks that uses an internet protocol suite to communicate between at least one network and at least one computing device.

In an exemplary embodiment, the request may be initiated from an external computing device such as, for example, a personal computer, a laptop, and a smartphone that is connected via the public computer network. For example, an employee of a business entity may initiate a request for a specific software package, such as, for example MICROSOFT OFFICE that is necessary to perform business functions from a remote location. In another exemplary embodiment, the request may be triggered by an internal system such as, for example, a software update system within a private computer network. For example, the software update system within the private computer network may initiate an update of a software package previously installed in the external computing device. The software update system may cause the external computing device to transmit a request soliciting the required updated software package.

In another exemplary embodiment, the request may include at least one from among a user identifier, a user credential, a device identifier, and a software package identifier. The request may include the aforementioned additional data to facilitate the authentication of the request. In another exemplary embodiment, the request may include the additional data as a single computer resource such as, for example, a computer file that contains several types of information. The information in the computer resource may consist of smaller packets of information that are individually different but share some common traits. In another exemplary embodiment, the additional data may be associated with the request as a set of data that describes and gives information about other data, such as, for example, metadata.

In another exemplary embodiment, the request may further include an upload request corresponding to a transfer of new data from an external computing device such as, for example, a user device to a private cloud network. The upload request may include identifying information corresponding to the external computing device that is used to authenticate the external computing device. In another exemplary embodiment, the upload request may include the data to be uploaded together with the identifying information so that the data may be uploaded to the private computer network in real-time with the authentication. For example, an external computing device may transmit a picture file together with the request to initiate authentication and upload of the picture file in real-time.

In another exemplary embodiment, the upload request may be initiated to authenticate the external computing device prior to transmission of the data to be uploaded. For example, the external computing device may initiate an upload request to authenticate the computing device via an authenticated path so that subsequent uploads from the external computing device may not require further authentication. As will be appreciated by a person of ordinary skill in the art, the transfer of new data from an external computing device to a private cloud network includes both the uploading of the new data from the external computing device as well as the downloading of the new data to the external computing device.

At step S404, a determination may be made as to whether the request is to be forwarded from the public computer network to a private computer network. The determination may be made by using a network security system based on a predetermined security rule. In an exemplary embodiment, the network security system may include a cloud computing solution such as, for example, a physical security as a service (PSaaS) system that monitors and controls incoming and outgoing network traffic based on predetermined security rules. The PSaaS may establish a barrier between the private computer network and the public computer network. In another exemplary embodiment, the network security system may also include intrusion avoidance systems such as, for example, an intrusion detection system (IDS) and an intrusion prevention system (IPS).

In another exemplary embodiment, a predetermined security rule may be used to define the types of network traffic that is allowed or blocked. The predetermined security rule may consist of firewall services which specifies the type of traffic and the ports that this type of traffic may use. In another exemplary embodiment, the predetermined security rule may be defined based on business requirements.

At step S406, the request may be authenticated via a web proxy based on a result of the determination. In an exemplary embodiment, identifying information may be extracted from the request and used to authenticate the request. The request may be authenticated by using a server application such as, for example, a web proxy that acts as an intermediary for requests from clients seeking resources from servers that provide those resources. In another exemplary embodiment, the web proxy may be connected to a software component such as, for example, an active directory federation service (ADFS). The web proxy may connect to the ADFS to enable single sign-on access to systems and applications located across organizational boundaries.

At step S408, a software package corresponding to the request may be identified from an internally hosted, software package storage system within the private computer network. In an exemplary embodiment, the software package may be managed by a software distribution application within the private computer network. The software distribution application may connect to network storage components to manage the identification and retrieval of software packages. As will be appreciated by a person of ordinary skill in the art, the software distribution application may be hosted on internal infrastructure of the private computer network. Then, at step S410, the identified software package may be retrieved from the software package storage system.

At step S412, the retrieved software package may be transmitted via the network interface in response to the request. In an exemplary embodiment, the software package may be transmitted to a user device along the same authenticated path as the received request. As will be appreciated by a person of ordinary skill in the art, the software package may be transmitted via the network interface to the external computing device consistent with embodiments recited in the present application.

In another exemplary embodiment, the enterprise distribution platform may be integrated into a private computer network such as, for example, a private cloud network. The private computer network may use private internet protocol (IP) addresses to enable access from connected computing devices. In another exemplary embodiment, the private computer network may incorporate multiple tiers to facilitate the connection of computing devices and outside networks. As will be appreciated by a person of ordinary skill in the art, the integration of the enterprise distribution platform into a private computer network enables a single software distribution platform to service computing devices within the private computer network as well as computing devices externally connected via a public computer network.

Figure 5:
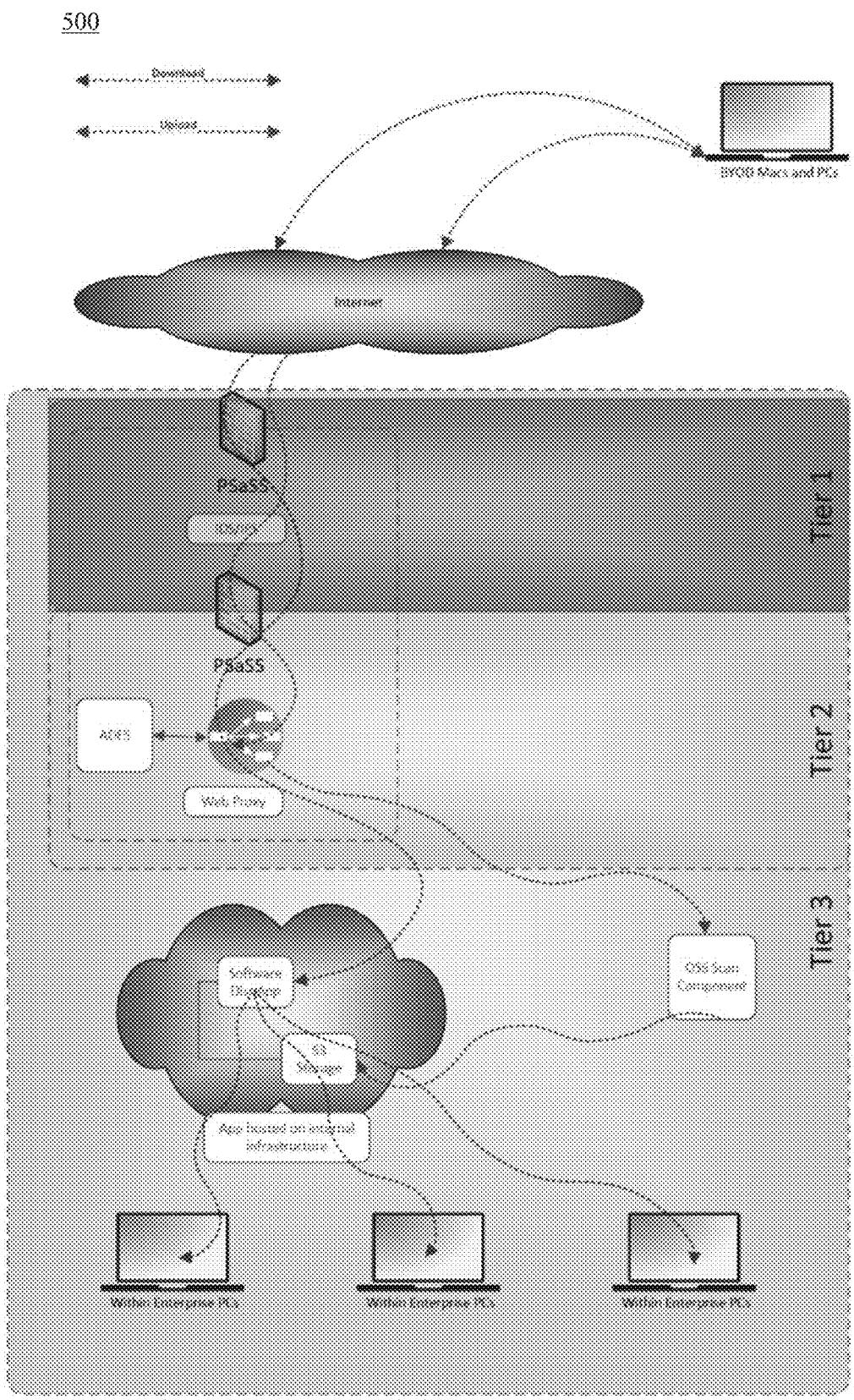
FIG. 5 is a flow diagram that illustrates a software and data distribution process that is usable for implementing a method for providing an enterprise distribution platform to facilitate software and data distribution over a public computer network, according to an exemplary embodiment.

FIG. 5 is a flow diagram 500 that illustrates a software and data distribution process that is usable for implementing a method for providing an enterprise distribution platform to facilitate software and data distribution over a public computer network, according to an exemplary embodiment. Flow diagram 500 provides a data distribution process that is usable to download data from a private computer network as well as to upload data to the private computer network.

As illustrated in FIG. 5, an external computing device may connect to the private computer network via a public computer network such as, for example, an internet network. The external computing device may use the public computer network to transmit a request to the private computer network. The transmitted request may be received and processed by a physical security as a service (PSaaS) system at a tier 1 layer of the private computer network. The PSaaS system may utilize intrusion avoidance systems such as, for example, an intrusion detection system (IDS) and an intrusion prevention system (IPS) to further process the received request. As will be appreciated by a person of ordinary skill in the art, the tier 1 layer may filter connection requests from the public computer network based on predetermined security rules.

After satisfying the requirements of the tier 1 layer, the request is passed through another PSaaS system before arriving at a tier 2 layer of the private computer network. In the tier 2 layer, the request may be authenticated by a web proxy application. The web proxy application may connect to an active directory federation service (ADFS) system to authenticate the request as well as an external computing device associated with the request. As will be appreciated by a person of ordinary skill in the art, the web proxy application may also be used to create a secure connection path with an external computing device.

Then, once authenticated, the request may then pass to a tier 3 layer of the private computer network. The tier 3 layer may include internal infrastructure of the private computer network such as, for example, software distribution applications and networked storage components. Additionally, the tier 3 layer may also include internal computing devices that are connected directly to the private computer network. In an exemplary embodiment, a scanning component may be implemented in the tier 3 layer to scan data that have been uploaded into the private computer network before the uploaded data is stored in a networked storage component. The scanning component may parse and filter incoming data based on predetermined business guidelines.

Accordingly, with this technology, an optimized process for providing an enterprise distribution platform to facilitate software and data distribution over a public computer network is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing an enterprise distribution platform to facilitate software distribution over a public computer network, the method being implemented by at least one processor, the method comprising:
  receiving, by the at least one processor via a network interface, at least one request from the public computer network, the at least one request relating to a solicitation for at least one software package;
  determining, by the at least one processor using a network security system, whether the at least one request is forwarded from the public computer network to a private computer network based on at least one predetermined security rule;
  filtering, by the at least one processor, the at least one request when the at least one request is forwarded from the public computer network,
    wherein the at least one request is filtered by using an intrusion detection system and an intrusion prevention system; and
    wherein the at least one request is recursively filtered by using the intrusion detection system and the intrusion prevention system;
  authenticating, by the at least one processor via a web proxy, the filtered at least one request;
  identifying, by the at least one processor based on a result of the authentication, the at least one software package corresponding to the at least one request;
  retrieving, by the at least one processor from a memory, the identified at least one software package; and
  transmitting, by the at least one processor via the network interface, the retrieved at least one software package in response to the at least one request.

2. The method of claim 1, wherein the public computer network includes a global system of interconnected computer networks that uses an internet protocol suite to communicate between at least one network and at least one device.

3. The method of claim 1, wherein the at least one request includes at least one from among a user identifier, a user credential, a device identifier, and a software package identifier.

4. The method of claim 1, wherein the enterprise distribution platform is integrated into at least one private cloud network.

5. The method of claim 4, wherein the at least one request includes an upload of new data from a user device to the at least one private cloud network via the enterprise distribution platform, the upload corresponding to a transfer of the new data.

6. The method of claim 1, wherein the at least one software package is transmitted along the same authenticated path as the at least one request without additional authentication.

7. The method of claim 6, wherein at least one subsequent software package is transmitted along the same authenticated path as the at least one request without additional authentication, the at least one subsequent software package including pre-authenticated identifying information.

8. The method of claim 1, wherein the network security system includes at least one from among a physical security as a service system, an intrusion detection system, and an intrusion prevention system.

9. A computing device configured to implement an execution of a method for providing an enterprise distribution platform to facilitate software distribution over a public computer network, the computing device comprising:
  a processor;
  a memory; and
  a communication interface coupled to each of the processor and the memory,
    wherein the processor is configured to:
      receive, via a network interface, at least one request from the public computer network, the at least one request relating to a solicitation for at least one software package;

determine, by using a network security system, whether the at least one request is forwarded from the public computer network to a private computer network based on at least one predetermined security rule;

filter the at least one request when the at least one request is forwarded from the public computer network,
- wherein the at least one request is filtered by using an intrusion detection system and an intrusion prevention system; and
- wherein the at least one request is recursively filtered by using the intrusion detection system and the intrusion prevention system;

authenticate, via a web proxy, the filtered at least one request;

identify, based on a result of the authentication, the at least one software package corresponding to the at least one request;

retrieve, from a memory, the identified at least one software package; and transmit, via the network interface, the retrieved at least one software package in response to the at least one request.

10. The computing device of claim 9, wherein the public computer network includes a global system of interconnected computer networks that uses an internet protocol suite to communicate between at least one network and at least one device.

11. The computing device of claim 9, wherein the at least one request includes at least one from among a user identifier, a user credential, a device identifier, and a software package identifier.

12. The computing device of claim 9, wherein the processor is further configured to integrate the enterprise distribution platform into at least one private cloud network.

13. The computing device of claim 12, wherein the at least one request includes an upload of new data from a user device to the at least one private cloud network via the enterprise distribution platform, the upload corresponding to a transfer of the new data.

14. The computing device of claim 9, wherein the processor is further configured to transmit the at least one software package along the same authenticated path as the at least one request without additional authentication.

15. The computing device of claim 14, wherein the processor is further configured to transmit at least one subsequent software package along the same authenticated path as the at least one request without additional authentication, the at least one subsequent software package including pre-authenticated identifying information.

16. The computing device of claim 9, wherein the network security system includes at least one from among a physical security as a service system, an intrusion detection system, and an intrusion prevention system.

17. A non-transitory computer readable storage medium storing instructions for providing an enterprise distribution platform to facilitate software distribution over a public computer network, the storage medium comprising executable code which, when executed by a processor, causes the processor to:

receive, via a network interface, at least one request from the public computer network, the at least one request relating to a solicitation for at least one software package;

determine, by using a network security system, whether the at least one request is forwarded from the public computer network to a private computer network based on at least one predetermined security rule;

filter the at least one request when the at least one request is forwarded from the public computer network,
- wherein the at least one request is filtered by using an intrusion detection system and an intrusion prevention system; and
- wherein the at least one request is recursively filtered by using the intrusion detection system and the intrusion prevention system;

authenticate, via a web proxy, the filtered at least one request;

identify, based on a result of the authentication, the at least one software package corresponding to the at least one request;

retrieve, from a memory, the identified at least one software package; and transmit, via the network interface, the retrieved at least one software package in response to the at least one request.

18. The storage medium of claim 17, wherein the at least one request includes at least one from among a user identifier, a user credential, a device identifier, and a software package identifier.

19. The storage medium of claim 17, wherein the executable code further causes the processor to integrate the enterprise distribution platform into at least one private cloud network, the at least one request including an upload of new data from a user device to the at least one private cloud network via the enterprise distribution platform and the upload corresponds to a transfer of the new data.

20. The storage medium of claim 17, wherein the executable code further causes the processor to transmit the at least one software package along the same authenticated path as the at least one request without additional authentication.

* * * * *